INVENTORS
NICOLAS J. HARRICK
MARC G. DREYFUS
BY
AGENT 3,394,253
INFRA-RED GAS ANALYSIS APPARATUS HAVING A CYLINDRICAL SAMPLE CHAMBER WITH A SMOOTH REFLECTING INNER SURFACE
Nicolas J. Harrick, Ossining, N.Y., and Marc G. Dreyfus, Stamford, Conn., assignors to North American Philips Company, Inc., New York, N.Y., a corporation of Delaware
Filed Oct. 22, 1965, Ser. No. 501,624
8 Claims. (Cl. 250—43.5)

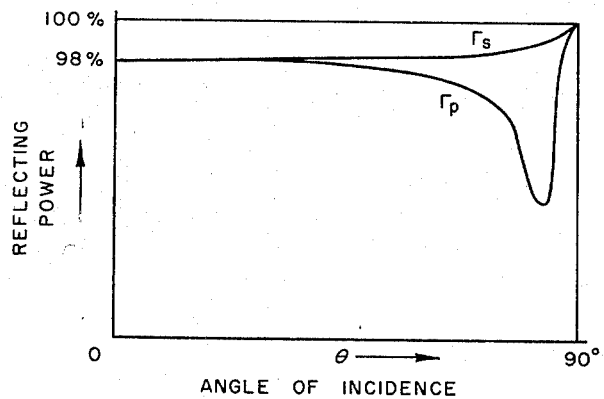
FIG. 1
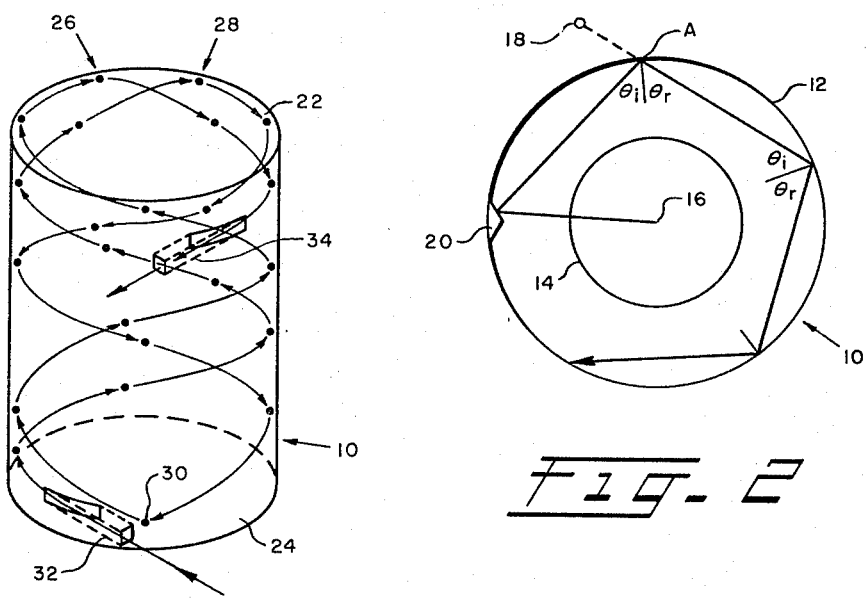
FIG. 2
FIG. 3
INVENTORS
NICOLAS J. HARRICK
MARC G. DREYFUS
BY
AGENT

ABSTRACT OF THE DISCLOSURE

A detecting instrument, especially for infra-red absorption analysis of small gas samples. The sample is introduced into a cylindrical enclosure with a smooth reflecting inner surface, and the analyzing radiation is introduced into the enclosure so as to cause it to multiply reflect along the inner surface while following a helical path until detected. A preferred arrangement provides the radiation source and detector inside the enclosure in the vicinity of its axis.

---

This invention relates to analytical and detecting instruments and more particularly to a method and apparatus for detecting a substance by optical absorption techniques.

Optical absorption measurements, particularly those in the infra-red optical region, have found utility in detection and analysis of relatively small quantities of optical absorbing materials. The degree of optical absorption taking place is dependent upon the particular concentration of optical absorbing material present, and upon the average length of path traversed by the optical energy. For the measurement of progressively smaller concentrations of absorbing material, the radiation must therefore traverse a progressively longer path. In order to fabricate an instrument of practical size, extensive optical folding techniques are utilized wherein a reflective enclosure is provided for the particular concentration of absorbing material being measured. A ray of light introduced into the optical enclosure at a first point will reflect about the interior of the enclosure coincident with the absorbing material until it reaches a detector which can then measure the decrease in intensity of the light. This decrease will be an indication of the optical absorption that has taken place. Limitations on the minimum concentration of optical absorbing material that can be measured become apparent when it is realized that some light energy is lost at each reflection. Further optical energy can be lost in systems of this type by the escape of light through entrance ports used for the introduction of samples in dynamic flow systems, or by other non reflecting segments in the path of the light. Finally, in randomly reflective enclosures a ray of light strikes the reflecting surface at varying angles of incidence throughout the enclosure, thereby materially changing the polarization orientation of the radiation electric vector with respect to the reflecting surface. If the electric vector of the electromagneitc radiation is rotated so that it is not strictly perpendicular to the plane of incidence, it is subjected to reflectance losses which increase with the angle of incidence and may be quickly attenuated to negligible intensity levels by multiple reflection.

Such devices for sensitive detection of optical absorption are invaluable for industrial and military field applications in detection of gaseous or other toxic agents present in the atmosphere. Here, it becomes important to provide a relatively compact, portable, light weight and rugged instrument.

It is therefore a prime object of this invention to provide a method of introducing optical energy through optical absorbing material in a reflective enclosure in such a manner as to maintain a ray of light at a relatively constant angle of incidence with respect to the reflecting surface.

It is a further object of this invention to provide a method of measuring relatively small concentrations of optical absorbing material by increasing the effective path of light energy through that material.

It is a still further object of this invention to provide an apparatus including an optical reflective enclosure with a high degree of efficiency which will result in a much reduced energy loss to levels heretofore unknown.

It is another object of this invention to provide an apparatus including an optically reflecting enclosure which will provide a rugged, lightweight, compact and effective instrument having a high degree of portability.

These and other objects of the invention will appear as the specification progresses and will be pointed out in the claims and illustrated in the accompanying drawings, which disclose, by way of example, the principle of the invention and the best mode contemplated of applying that principle.

The length of an optical path in a reflective enclosure is theoretically infinite. Practically speaking even when the enclosure contains no optically absorbing material, the intensity of the optical flux is quickly reduced below usable levels by multiple reflective losses, as well as escape through non reflective apertures within the optical enclosure. On the other hand, it can be shown that the optimum design of a lossless spectrophotometric instrument system is reached when the resultant energy after traversing the absorbing medium has been decreased by a factor equal to the reciprocal of the natural logarithm base $e$. Therefore, in accordance with the principle of the present invention, a longer and better defined effective optical path is provided by maintaining the optical energy level as high as possible after the successive reflections within the enclosure.

In accordance with one aspect of the invention, light may be introduced into a relatively cylindrical body at angles of incidence and elevation sufficient to allow the light to follow an approximately helical or spiral-like segmented path around the inner surface length of the cylinder until reaching the opposite end portion thereof. These end portions can be reflective caps which will reflect the light back down the inner surface length of the cylinder in a manner similar to its rise. Because the optical path is thus confined close to the inside surface of the cylinder along its length, the central or interior section of the cylinder is optically inactive and may be utilized for sample flow ports for introduction of the sample to be measured, without incurring substantial optical energy loss by escape.

The invention will now be described in greater detail with reference to the accompanying drawing wherein:

FIGURE 1 shows a graphical illustration of the reflecting power for a metallic surfaces in the infra-red optical region for varying angles of incidence.

FIGURE 2 shows, in end cross-sectional view, a schematic illustration of the path followed by light rays in accordance with the principle of the invention.

FIGURE 3 illustrates in perspective the path taken by the optical energy described in FIGURE 2.

Figure 4:
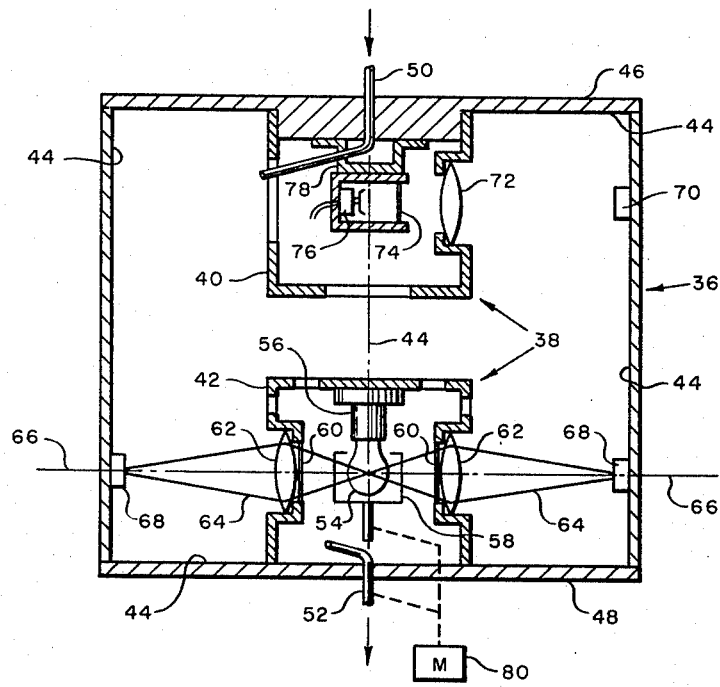
FIGURE 4 shows a cross-sectional view of a practical instrument incorporating the principle of operation of the present invention, and, FIGURE 5 shows an alternative embodiment of the instrument disclosed in FIGURE 4.

Referring now to FIGURE 1 there is shown a graphical illustration of the reflecting power of a silvered metallic surface wherein the incident light may have a wave length of approximately 10 microns (infra-red region). The upper curve $r_s$ represents a plane polarized wave with its electric vector perpendicular to the plane of incidence and the lower curve $r_p$ represents a plane polarized wave with its electric vector parallel to the plane of incidence. By proper geometric design, a light enclosing chamber will have incidence angles and polarization ranges resulting in the highest possible reflection power. The infra-red spectral region is preferable to shorter wave length regions such as visible or ultraviolet because of the generally greater reflective efficiency of a metallic surface under the infra-red illumination.

As shown in FIGURE 2 a practical embodiment for incorporating the above feature is realized with an outer cylinder 10 having an interior reflecting surface 12 and an inner cylinder 14 housing therein a light source, detector and air ports as will be described in further detail below. Optical energy, originating either at an internal point 16, axially located within the inner cylinder 14, or at an external point 18 is introduced onto the inner surface of the outer cylinder either by means of a prism reflector 20 or directly at a point A. The angle of incidence $\theta_i$ at which the optical energy strikes the inner surface of the outer cylinder is designed to provide reflections that will not strike the inner cylinder surface 14. Because of the surface geometry of the cylinder 10, the angle of reflection $\theta_r$ and all subsequent angles of incidence $\theta_i$ and reflection $\theta_r$ will remain equal. Within the cylinder the optical energy takes a helical or spiraling path along the length of the inner surface of the cylinder. This is shown in perspective in FIGURE 2 and is due to the introductory angle of elevation of the incident light with respect to an imaginary plane drawn orthogonally to the longitudinal axis of the cylinder. The upper 22 and lower 24 portions of the cylinder 10 are made reflective so as to cause the light spiraling along the length of the cylinder to propagate in both directions. Points 26 and 28 are illustrative to top reflections while the point 30 is illustrative of a bottom reflection. For purposes of illustration the optical energy is indicated as entering through a channel 32 and emerging through a channel 34, as will be described in further detail below with reference to FIG. 5.

A practical embodiment of a device incorporating the method of optical analysis discussed above is shown in FIGURE 4 wherein there is provided an enclosed relatively cylindrical outer body or enclosure 36 which may be constructed of aluminum or other similar material, and a relatively cylindrical inner body or enclosure 38 composed of an upper support section 40 and a lower support section 42. The inner area 44 of the outer enclosure or cylinder 36 is coated by a suitable metallization process with a highly reflective material such as gold or the like. Affixed to the upper circumference of the cylinder 36 is an upper capping segment 46 which serves to close off the upper portion of the cylinder 36 as well as to form a supporting surface for the upper section 40 of the inner enclosure 38. Similarly, a lower capping segment 48 serves to close off the lower portion of the cylinder 36 and support the lower section 42 of the inner body 38. The inner area of the caps 46 and 48 are also coated with a highly reflective material such as gold or the like by a suitable metallization process.

An injection manifold tube 50, for introduction of air or other carrier sample containing the substance to be selected into the inner volume of the cylinder 36, is mounted into the cylinder top cap 46. The flow direction is indicated by an arrow. A lower tube 52 serves to vent the inner volume of the cylinder thereby maintaining a continual flow of air through the entire enclosure. To provide maximum air circulation, the upper and lower portions of the inner cylinder 38 contain a series of perforations around the sides and inner segments thereof.

A source of radiant energy 54, preferably operative in the infra-red region, is mounted in the lower section 42, at a point along the longitudinal axis 44 of the cylinder 36 somewhat below the approximate middle thereof. Mounting is accomplished by a suitable means 56.

Radiation emanating from the source 54 is interrupted periodically by means of a drum chopper 58, mounted in juxtaposition with the source 54. The drum chopper 58 may for example consist of three opaque blades, each subtending an angle of 60°, and separated by three 60° air gaps or transparent segments. When the chopper rotates, radiation is transmitted in only one lateral direction at a time. Therefore, the two radiation paths into the inner volume of the cylinder are modulated 180° out of phase.

The emergent radiation passes through in either direction, a spectral filter 60 and a focusing lens 62. The resultant rays of light emerge from the lens 62 in the form of a cone 64 having an angular range which may be approximately 40°. Consequently, most of the rays in the cone of optical radiation 64 emerging from the lens 62 will have a finite angle of elevation or declination with respect to a plane surface, indicated symbolically by a line 66, orthogonal to the longitudinal axis 44 of the cylinder 36. It will be understood by the above language that the purpose of the optical arrangement is to insure that incident light on the reflective inner surface 44 of the outer cylinder 36 will be initially introduced thereto to enable propagation to be effective along the entire inner length of the cylinder by the highest possible proportion of initial incident light, and the above configuration is by no way intended to limit the scope of the invention to the particular arrangement described herein. Other arrangements are indeed feasible and will be further discussed below.

The chopped radiation is optically coupled to and falls incident upon either a first or second silvered reflecting prism 68, mounted on the inner wall 44 of the cylinder. The prismatic reflecting angle is designed such that light reflected therefrom will have a high enough angle of reflection so that with respect to subsequent strikes of the rays upon the inner wall 44 of the cylinder 36, the inner cylinder 38 will not be struck. The prism angle is further dependent upon the countervailing requirement of relative flatness along the cylinder wall. The prism chosen may typically be a 30–120–30 degree prism, but would vary in accordance with the relative cylindrical geometry. Under such conditions, the probability of escape of optical energy through air entrance ports and the like is greatly reduced.

After striking the prisms, incident radiation will take a spiral or helical specularly reflecting path around the inner wall 44 of the cylinder 36. The reflective propagation will be initially in both vertical directions because of the angles of elevation and declination with which the emergent rays 64 strike the prism 68, and will continue in both directions due to the reflective inner surface of the capping portions 46 and 48. The sample under test may be present or introduced into the enclosure chamber during the course of the optical traverses, and optical absorption due to the presence of an optical absorbing agent within such sample will take place as a result of collisions between rays of light and optical absorbing agents in the sample. At some point during the path of optical traverse, rays of radiation will strike a further prism 70 similarly mounted on the inner wall of the cylinder 36 but at a point spaced from the prisms 68. The radiation incident upon the prism 70 is rotated through an angle sufficient to redirect the optical energy into a focusing lens 72 mounted in the upper section 40 of the inner cylinder 38. The lens 72 focusses the radiation thereon onto filter 74, and then to a detector 76. The effect of interception of the optic rays by any optically absorbing material within the sample in the cylinder 36 is measured by a relative reduction in intensity of the flux detected by the detector 76 compared to that detected in the absence of such optical absorption.

Suitable means, not shown, are provided for utilizing or indicating by means of alarms and the like, the information detected by the detector 76. It is to be understood that the device may be employed over a wider range of optical wavelengths by the substitution of a monochrometer or the like in place of the filter unit. The light source could be a white source and the monochrometer utilized to scan the optical range desired for a more complete band analysis.

A motor unit 80 serves to drive the chopper 58 and may also, by means of fan blades or the like, be utilized to drive the flow of air or sample through the cylinder.

It is understood that the inner cylinder body 38 serves to assist in the direction of sample or carrier flow as well as to serve as structural support for the optics and detection units. It is further understood that other means of supporting optics or channeling sample flow may be employed within the spirit and scope of the present invention.

Figure 5:
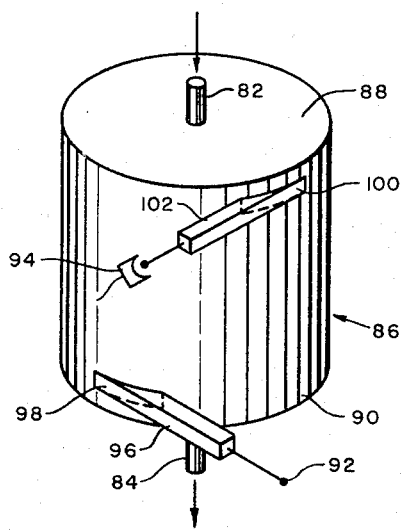

Turning to FIG. 5, a perspective view showing of an alternate embodiment of a device utilizing the method of the present invention is illustrated. The sample or air inlet 82 and outlet 84 is mounted on an optical enclosure 86 having a substantially cylindrical shape. The inner surface area, not shown, of the enclosure is reflectively coated, as are the upper capping segments 88 and lower capping segments 90. A radiation source 92 and a detector unit 94 are mounted external to the enclosure. Optical energy in the form of rays emanating from the source 92 are introduced or injected into enclosure 86 by means of an optically conducting waveguide or channel 96 through an entrance slit 98, and removed from the enclosure through an axit slit 100 along an optical waveguide 102. The introduction of the sample into the enclosure 86, coincident with the spiraling specular reflection caused by introduction of the optical energy ray at a slight angle of elevation with respect to a plane surface orthogonal to the longitudinal axis of the enclosure, resulting in measurable optical absorption, will be indicated by the detector.

Although the latter arrangement lacks the compactness of the embodiment of FIGURE 4, it does allow more freedom in the location of entrance and exit slits at convenient points along the enclosure surface. It is understood that the waveguide described above are merely illustrative of the intended function. Any convenient mode of injecting light into the enclosure may be employed including rectangular reflective shells, fiber optics, and the like.

In summary, our invention utilizes the geometry of a reflective cylindrical surface and a specifically oriented beam of optical energy to enable optical absorption to take place at levels heretofore too minimal to be practically detected. Additionally, our invention has been so packaged as to form a rugged, economic, compact and portable instrument suitable for civilian or military field work as well as an effective diagnostic laboratory or factory apparatus.

While we have described our invention in connection with specific embodiments and applications thereof, other modifications will be apparent to those skilled in the art without departing from the spirit and scope of the invention as defined in the appended claims.

What is claimed is:

1. A device for detecting the presence of a substance comprising a substantially enclosed, cylindrical body having a longitudinal axis and having a smooth, reflective, cylindrical inner surface, means connected to said body for introducing a sample containing the substance to be detected into said body, means for introducing radiant energy onto said reflective inner surface at a high angle of incidence and at an angle of elevation relative to a plane surface orthogonal to the said longitudinal axis to initiate a sequence of spiraling reflections of said energy along the said inside surface over a relatively long path, and means for detecting the reflected energy to ascertain the effect of the said substance on the said radiant energy.

2. A device as set forth in claim 1 wherein the radiant energy introducing means extends externally of the cylindrical body, and the detecting means is located externally of the cylindrical body.

3. A device for detecting the presense of a substance comprising a substantially enclosed, outer, cylindrical body having a longitudinal axis and having a smooth, reflective, cylindrical inner surface, means located within a region of said body adjacent the axis for introducing a sample containing the substance to be detected into said body, a source of radiant energy located within a region of said body adjacent the axis, means for directing radiant energy from said source onto said reflective inner surface at a high angle of incidence and at an angle of elevation relative to a plane surface orthogonal to the said longitudinal axis to initiate a sequence of spiraling reflections of said energy along the said inside surface over a relatively long path, and means located within a region of said body adjacent the axis for detecting the reflected energy to ascertain the effect of the said substance on the said radiant energy.

4. A device as set forth in claim 3 wherein optical means are mounted on the said cylindrical inner surface in a position to receive the radiant energy and to direct it onto the reflective inner surface at the desired angle.

5. A device as set forth in claim 4 wherein optical means are mounted on the said cylindrical inner surface in a position to receive the reflected energy and direct it toward the detecting means.

6. A device as set forth in claim 3 wherein top and bottom end caps are provided to close off the cylindrical body, said end caps having smooth reflective surfaces where impinged by the radiant energy.

7. A device for detecting a gaseous agent in air by random optical absorption over a relatively long optical path comprising a relatively cylindrical outer enclosure, a relatively cylindrical inner enclosure substantially coaxial with said outer enclosure, the inner area of said outer enclosure being relatively reflective, said outer enclosure having upper and lower capping portions, the inner area of said caping portions being relatively reflective, means connected to said outer enclosure for causing therein a continuous flow of sample containing the gaseous agent to be detected, a source of radiant energy, said source being mounted within said inner enclosure at a first point substantially along the longitudinal axis thereof, first reflecting prism means, said first reflecting prism means being mounted on the inner wall of said outer enclosure and being optically coupled to said source of radiation so as to cause rays emanating from said source of radiant energy to strike the said inner surface of said outer enclosure with angles of incidence and with a finite angle of elevation or declination with respect to a plane surface orthogonal to the longitudinal axis of said outer enclosure sufficient to initiate thereby a sequence of spiraling specular reflections of said rays along the length of the said inner surface and capping portions thereof over a relatively long optical path, said path coinciding with the said flow of sample such that a number of collisions occur between said rays and said gaseous agent, detector means, said detector means being mounted within said inner enclosure at a second point substantially along the longitudinal axis thereof, and second reflecting prism means, said second reflecting prism means being mounted on the inner wall of said outer enclosure and being optically coupled to said detector for conveying to said detector the rays as modified by said collisions and thereby indicate the presence of said gaseous agent.

8. A device for detecting a concentration of gaseous agent in air by optical absorption over a relatively long optical path comprising a relatively cylindrical outer enclosure, a relatively cylindrical inner enclosure substantially coaxial with said outer enclosure, the inner area of said outer enclosure being relatively reflective, said outer enclosure having upper and lower capping portions, the inner area of said capping portions being relatively reflective, means connected to said outer enclosure for causing therein a continuous flow of sample containing a trace of the gaseous agent to be detected, a source of radiant energy, said source being mounted within said inner enclosure at a first point substantially along the longitudinal axis thereof, first and second reflecting prisms, said first and second prisms being mounted on the inner wall of said outer enclosure and being optically coupled to said source of radiation so as to cause rays emanating from said source of radiant energy to strike the said inner surface of said outer enclosure with angles of incidence and with a finite angle of elevation or declination with respect to a plane surface orthogonal to the longitudinal axis of said outer enclosure sufficient to initiate a sequence of spiraling specular reflections of said rays along the length of the inner surface and capping portions thereof over a relatively long optical path, said path coinciding with the said flow of sample such that a number of collisions will occur between said rays and said gaseous agent, chopper means, said chopper means being interposed between said source of radiation and said first and second reflecting prisms so that rays emanating from the source of radiation strike each of the respective prisms alternately, detector means, said detector means being mounted within said inner enclosure at a second point substantially along the longitudinal axis thereof, and third reflecting prism means, said third reflecting prism means being mounted on the inner wall of said outer enclosure and being optically coupled to said detector for conveying to said detector the effect of said collisions on said rays and thereby indicate the relative concentration of said gaseous agent.

References Cited

UNITED STATES PATENTS 3,120,608  2/1964  Bird _____ 250—43.5
3,319,071  5/1967  Werth et al. _____ 250—43.5

RALPH G. NILSON, *Primary Examiner.*

A. L. BIRCH, *Assistant Examiner.*